United States Patent [19]

Take

[11] Patent Number: 5,181,232
[45] Date of Patent: Jan. 19, 1993

[54] DIESEL ENGINE REVOLUTION COUNTER

[75] Inventor: Shigeo Take, Yokosuka, Japan

[73] Assignee: Oppama Kogyo Kabushiki Kaisha, Kanagawa, Japan

[21] Appl. No.: 679,924

[22] Filed: Apr. 3, 1991

[30] Foreign Application Priority Data

Nov. 14, 1990 [JP] Japan .................................. 2-307515

[51] Int. Cl.$^5$ ......................... H04B 1/10; H03K 21/02
[52] U.S. Cl. ........................................ 377/30; 377/55; 307/362; 307/517; 328/115
[58] Field of Search ....................... 307/362, 517, 518; 377/30, 55; 328/115, 109

[56] References Cited

U.S. PATENT DOCUMENTS 3,280,937 10/1966 Faber et al. ........................... 307/517
3,944,934 3/1976 Francis .................................. 307/518
4,519,091 5/1985 Chu et al. ............................... 377/30
4,694,256 9/1987 Kawamura ............................ 307/517

Primary Examiner—John S. Heyman
Attorney, Agent, or Firm—Bauer & Schaffer

[57] ABSTRACT

The revolutions of a diesel engine are counted by providing vibration detector converting the vibration propagating through the fuel injection pipe into an electric signal; an amplitude sorter for receiving the electric output signal of the detector and providing an output signal when the amplitude becomes larger than a predetermined level; a waveform shaper for receiving the output signal of the sorter and converting respective pulse groups to single pulse outputs. The respective pulses from the sharper are judged to determine whether signal pulse in the present period is within a predetermined allowable range or not, and thereby determining whether respective pulses are "normal" pulses or not. The number of normal pulses per unit time are counted and displayed on a monitor.

7 Claims, 7 Drawing Sheets

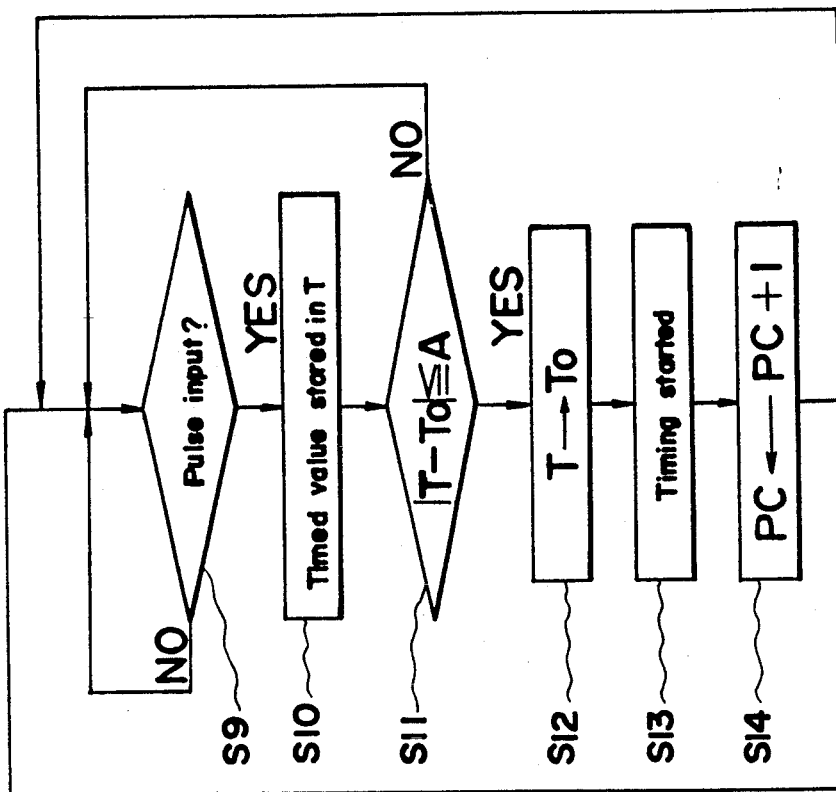
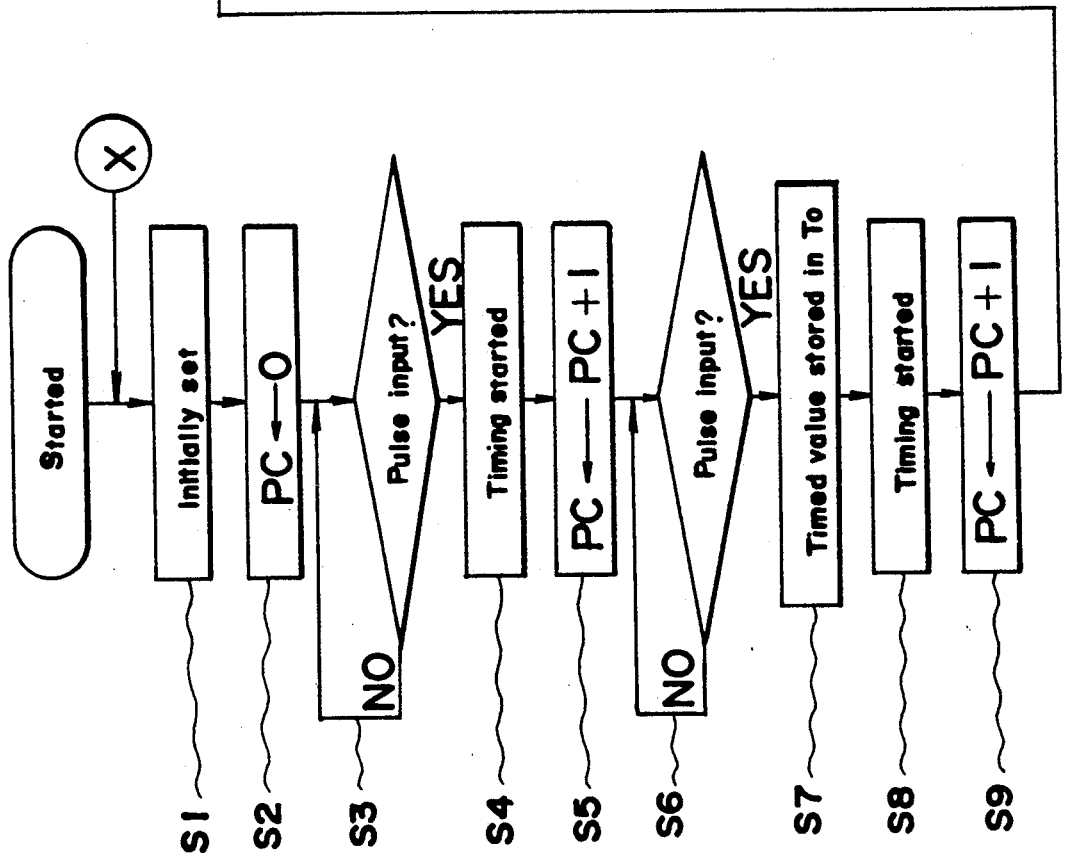
FIG.6

DIESEL ENGINE REVOLUTION COUNTER

FIELD OF THE INVENTION

This invention relates to a counter for counting and displaying the number of revolutions of a diesel engine.

BACKGROUND OF THE INVENTION

The number of revolutions (RPM) of a diesel engine has been conventionally counted on the basis of a detected signal by a mechanical detector or magnetic detector fitted to an output shaft of the diesel engine or to a cam driving shaft of a fuel injection pump rotating in proportion to the output shaft. However, in the respective cases, it is difficult to retrofit the detector to the output shaft or to a cam driving shaft when the diesel engine has been incorporated in an automobile or the like.

Among the vibration components propagated through the fuel injection pipe of a diesel engine is a component generated at the end of the injection cycle. This component, generated by a needle valve within the nozzle of a cylinder associated with the fuel injection pipe, has an amplitude larger than that of the other vibration components. Therefore, when the vibration propagated through the fuel injection pipe is converted to an electric signal, only the component of the signal obtained from the vibration the end of injection need be counted. In this case, the detecting means may be fitted to the fuel injection pipe, and therefore, a simpler installation may be obtained then in the conventional case, where the detector is fit to a rotary shaft.

However, according to experiments made by the present inventor, the number of revolutions could be accurately counted only at the time of low engine revolution and not at the time of high engine revolution. This is because at the time of high engine revolution, the vibration components propagating through the fuel injection pipe not only include the amplitude of the vibration component (called a "signal vibration component") generated at the end of the injection within the nozzle of the cylinder corresponding to the above-mentioned fuel injection pipe but also the amplitude of the vibration component (called a "noise vibration component") generated at the end of the injection within the nozzle of another (i.e. adjacent) cylinder. The latter vibration might become larger than the first mentioned predetermined level, and therefore, the noise vibration component might also be sensed as a signal vibration component.

BRIEF SUMMARY OF THE INVENTION

Accordingly, it is an object of the present invention to provide an engine revolution counter wherein a detecting means can be easily fitted and the number of revolutions can be accurately counted not only at the time of low revolution but also at the time of high engine revolution.

The present invention comprises a vibration detection means for converting the vibration in a fuel injection pipe to an electric signal; an amplitude sorting means for receiving the output signal and for providing an output signal when the amplitude is larger than a predetermined level, the output signal comprising individual pulse groups corresponding to respective fuel injection cycles; a waveform shaping means for receiving the output signal of the amplitude sorting means and for converting respective pulse groups of the output signal of the amplitude sorting means into a pulse output signal, the pulse output signal comprising individual pulses, each of the pulses having a pulse width equal to the duration of its corresponding pulse group; a judging means for receiving the pulse output signal, determining from respective pulses whether the period between respective pulses deviates from the preceding period between respective pulses by more than a predetermined amount and thereby determining whether the respective pulses of the pulse output signal are normal pulses or not; counting means for counting the number of pulses per unit time of only the normal pulses; and display means for displaying the number of revolutions corresponding to the counted value from the counting means.

Therefore, according to the present invention, the accurate number of revolutions of a diesel engine can be always displayed by the above-mentioned displaying means.

According to the present invention, the above-mentioned vibration detecting means may be fitted to a fuel injection pipe of a diesel engine and is therefore easier to fit than when the prior art devices are fit to a rotary shaft.

BRIEF DESCRIPTION OF THE DRAWINGS

FIG. 6 is a flow chart showing a main program routine; and

DETAILED DESCRIPTION OF THE PREFERRED EMBODIMENT

Figure 1:
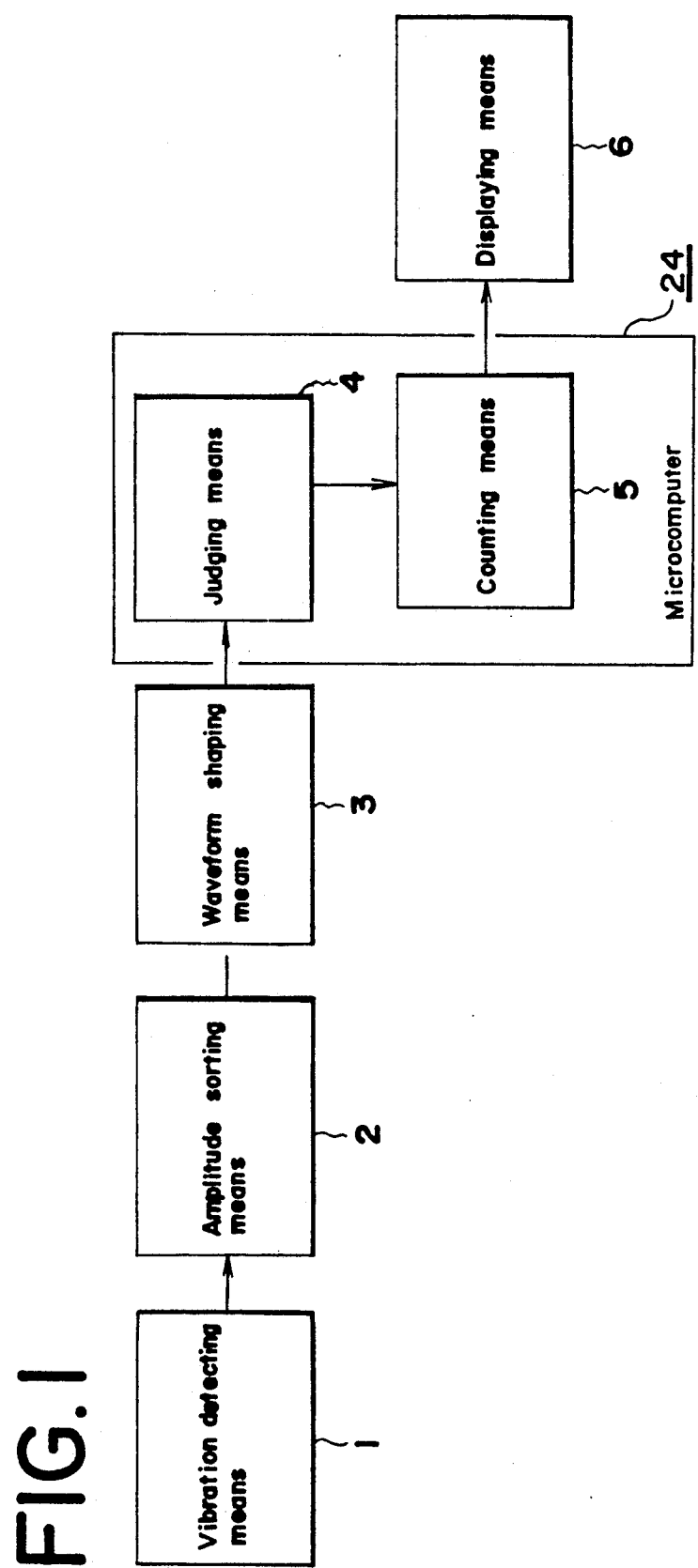
FIG. 1 is a block diagram showing the basic formation of a diesel engine revolution counter according to the present invention.

As shown schematically in FIG. 1, the system of the present invention comprises a vibration detecting assembly 1 adapted to convert a vibration to an electric signal. An amplitude sorting means 2 receives the output signal from the vibration detecting means 1 and produces another output signal when its amplitude becomes larger than a predetermined level. A waveform shaping means 3 receives the output signal from the amplitude sorting means 2 and converts respective pulse groups thereof into a pulse output signal. A judging means 4 receives the pulse output signal of the waveform shaping means 3 and determines on the basis of the respective pulses of the pulse output signal whether the present period between respective pulses deviates from the previous period between respective pulses by more than a predetermined amount. Thereby, the respective pulses of the output signal of the waveform shaping means 3 are judged a being normal pulses or not. Further, a counter 5 counts the number of pulses per unit time of only the normal pulses, among the respective pulses of the output signal of the above-mentioned waveform shaping means 3, as detected by the judging means 4. The number of revolutions, i.e., corresponding to the counted value of the counting means 5, is displayed on the display 6.

Figure 2:
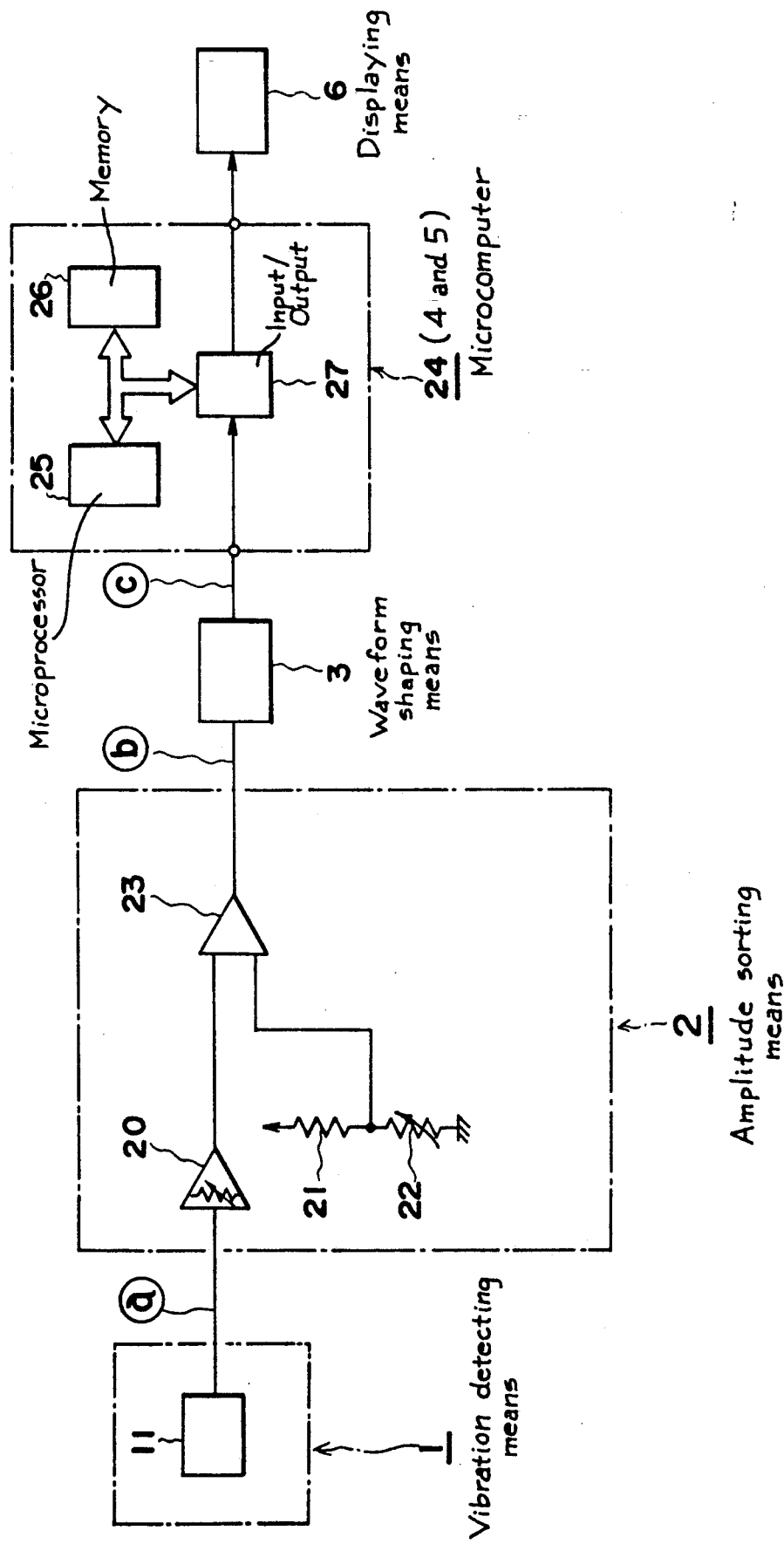
FIG. 2 is an electric circuit diagram showing a diesel engine revolution counter relating to an embodiment of the present invention.
Figure 3:
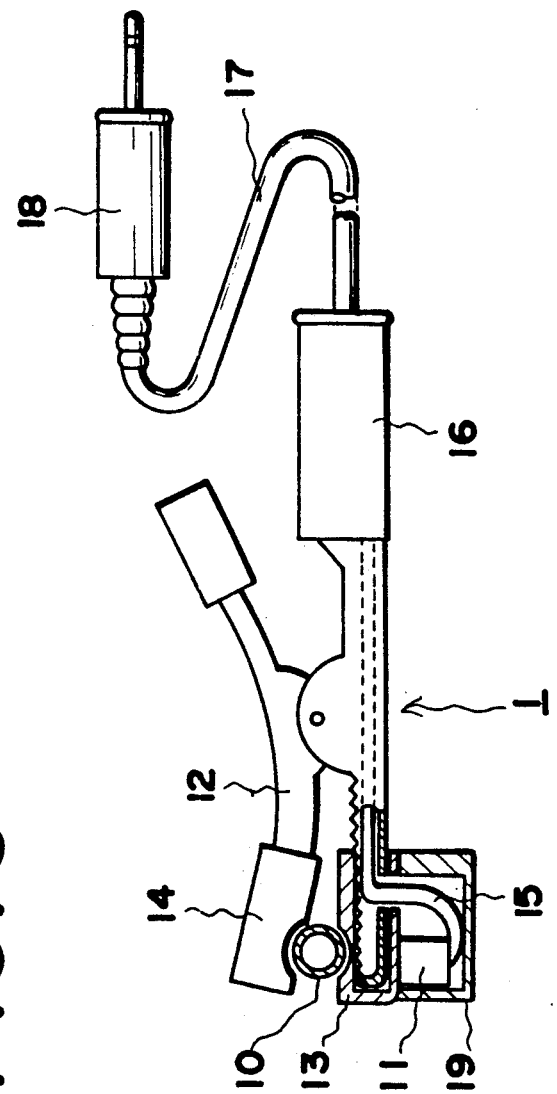
FIG. 3 is a partly sectioned elevation showing an example of a vibration detecting means.

FIGS. 2 and 3 illustrate in greater detail the system of the present invention. Turning initially to FIG. 3, the vibration detecting assembly 1, seen attached to a fuel injection pipe 10 of a diesel engine comprises a condenser microphone 11 mounted on an alligator clip 12. The clip 12 is provided with rigid caps 13 and 14 at the tips of its arms, which caps are made of resin such as polypropylene. The caps 13 and 14 have concave recesses into which the pipe 10 may fit. The condenser microphone 11 is secured to the outside surface the lower cap 13 and its output lead wire 15 is led through the associated arm 16 of the alligator clip 12 to an extension wire 17 terminating in a jack 18. A cover 19 fixed to the clip 12 encloses the condenser microphone 11.

As a result of placing the fuel injection pipe 10 between caps 13 and 14, the vibration within the fuel injection pipe 10 will be sensed by the condenser microphone 11. The vibration is converted to an electric signal which is fed to the jack through the lead wire 15 and extension wire 17.

Figure 4:
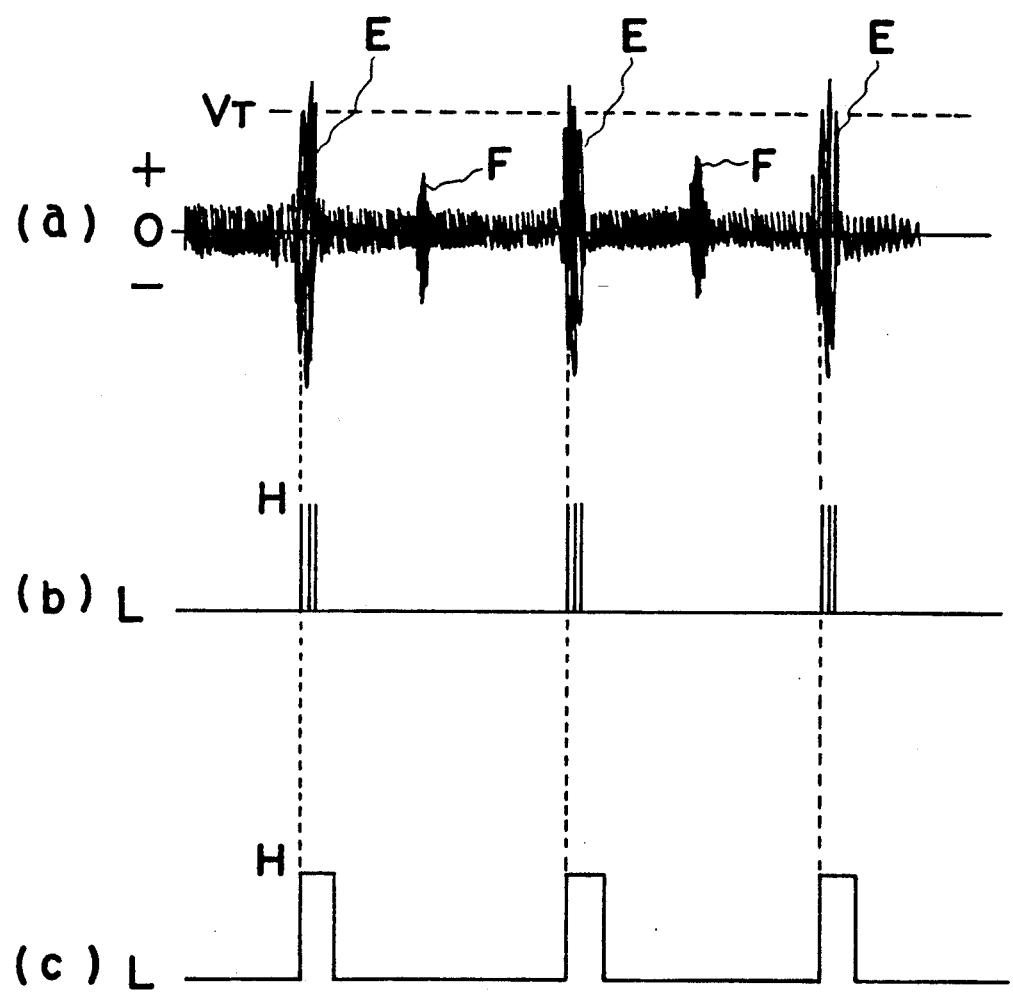
FIG. 4(a), (b), and (c) are waveform diagrams of respective parts of a circuit at the time of low revolutions.
Figure 5:
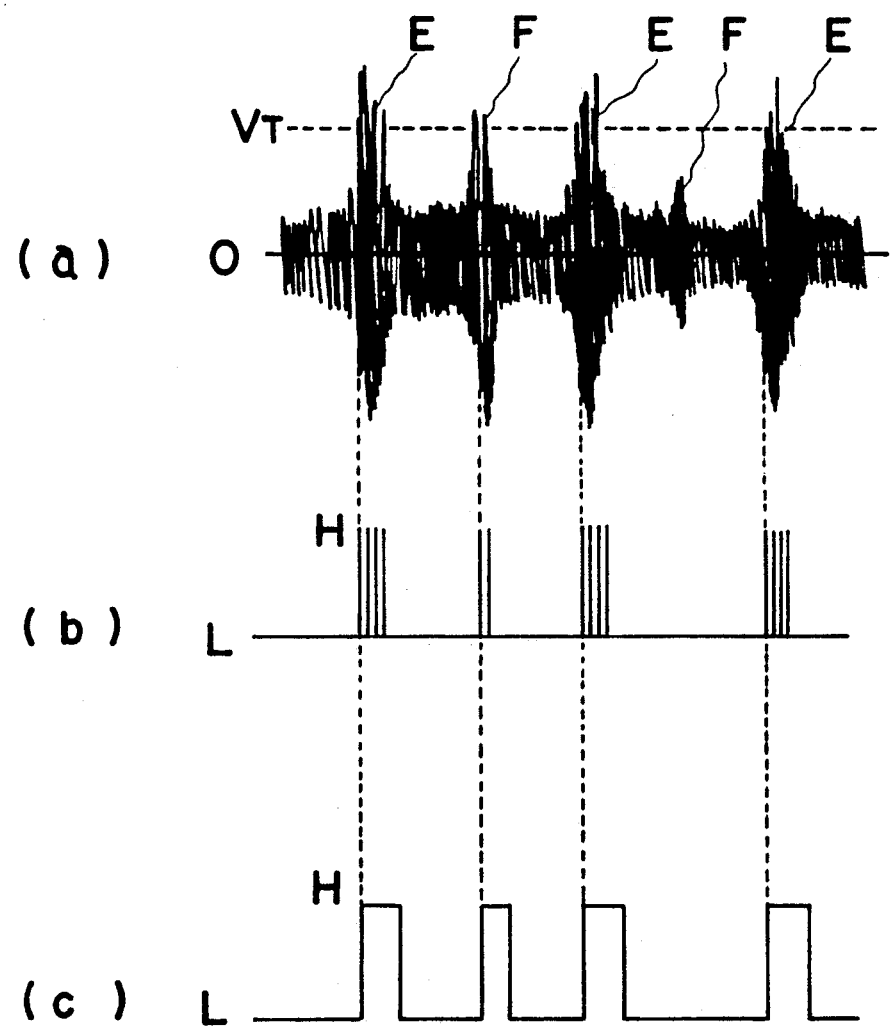
FIG. 5(a), (b), and (c) are waveform diagrams of respective parts of a circuit at the time of high revolutions.

The output signal of the vibration detecting assembly 1 is illustrated by the waveform (a) in FIGS. 4 and 5 when used for example with a diesel engine of 4 cycles and 4 cylinders. The waveform will be of such shape as is shown in FIG. 4(a) at the time of low revolutions and will be of such shape as is shown in FIG. 5(a) at the time of high revolutions. The section E having the largest amplitude in these waveforms corresponds to the vibration component generated, at the end of the injection, by a needle valve within the nozzle of the cylinder corresponding to the fuel injection pipe 10. The Section F having an amplitude smaller than that of Section E but larger than in the rest of the waveform, corresponds to the vibration component generated at the end of the injection by a needle valve within a nozzle of another, i.e. adjacent cylinder. At the time of high revolution, the amplitude of the rest of the signal will be generally larger than the corresponding section at the time of low revolution.

The construction of the vibration detecting assembly 1 is not limited to that illustrated. For example, any other kind of microphone, piezo-electric device, or other means may be used in place of the condenser microphone 11. Further, the means by which they are held is not limited to the alligator clip.

Returning now to FIG. 2, the output signal (a) from the vibration detecting means 1 is fed to the amplitude sorting means 2 which comprises a variable gain amplifier 20 adapted to amplify only the positive signal of the output signal of the vibration detecting means 1; a comparator 23 comparing a reference voltage level determined by the divided pressure ratio of resistances 21 and 22 and the output signal of the variable gain amplifier 20 and providing an H signal (high level signal) when the signal to the comparator 23 becomes higher than the reference voltage level. Therefore, in this example, the above-mentioned reference voltage level, as converted by the gain of the variable gain amplifier 20, comprises a predetermined level $V_T$ which can be adjusted by properly adjusting the gain of the variable gain amplifier 20 or the above-mentioned reference voltage level. Although not shown in the drawing, a knob for adjusting the above-mentioned predetermined level $V_T$ is provided so as to be properly and simply operated by the user. The above-mentioned predetermined level $V_T$ is kept adjusted so as to be smaller than the amplitude of the above-mentioned waveform section E at the time of low revolution (for example at the time of idling revolutions) and to be larger than the amplitudes of the above-mentioned waveform section F and the rest of the waveform. This adjustment is not made while viewing an oscilloscope but is made, in fact, at the time of engine idling, while viewing the display on the display monitor 6. The knob is operated so that the monitor 6 may first display 0 rpm and is then gradually moved to reduce the predetermined level $V_T$ and, when the monitor 6 is stabilized at a proper value, the adjustment is terminated.

The output signal (b) from the amplitude sorting means will be of such waveform as is shown in FIG. 4(b) at the time of low revolution but will be of such waveform as is shown in FIG. 5(b) at the time of high revolution. That is to say, at low revolution, when the output signal (a) of the vibration detecting means 1 becomes higher than the predetermined level $V_T$, an H signal will be obtained from the amplitude sorting means 2, only at the respective time points corresponding to the respective waveform sections E of the output signal of the vibration detecting means I, pulse groups of one group respectively short in the period will be obtained. At high revolution the H signal will be obtained no only at the respective time points corresponding to the respective waveform section E but also at the time points corresponding to the waveform Sections F.

The signal output (b) from the amplitude sorting means 2 is fed to the waveform shaper 3 where respective pulse groups are converted to a pulse output signal. The pulse output signal, illustrated in FIGS. 4(c) and 5(c) comprises individual pulses, each of the pulses having a pulse width equal to the duration of its corresponding pulse group. A one-shot multi-vibrator is preferably used for the waveform shaping means 3, although a formation using, for example, an integrating circuit can be used.

As noted, the output signal (c) from the waveform shaping means 3 will be of such waveform as is shown in FIG. 4(c) at the time of low revolution and of such waveform as is shown in FIG. 5(c) at the time of high revolutions. Thus, a pulse is obtained at the time of low revolution, only at the respective time points corresponding to the respective waveform section E—that is, only at the end of the injection of the corresponding cylinder. At the time of high revolution a pulse is obtained not only at the respective time points corresponding to the respective waveform sections E but also at the time points corresponding to the waveform sections F. As a result, at the time of high revolution, not only is one pulse obtained at the end of the injection of the corresponding cylinder but also a pulse is obtained at the end of the injection of another, i.e., adjacent cylinder.

The pulse outputs (c) are fed to a microcomputer 24 functioning as both the judging means 4 and counting means 5 shown in FIG. 1. This microcomputer 24 comprises a microprocessor 25, a memory 26, and input-output port 27 into which the output of the above-mentioned waveform shaping means 3 is input. The monitor output port of the above-mentioned input-output port 27 is connected to the monitor 6 on which the number of revolutions corresponding to the counted value is viewed. Concretely, such displays as an LCD and LED can be used instead of the monitor 6.

Figure 7:
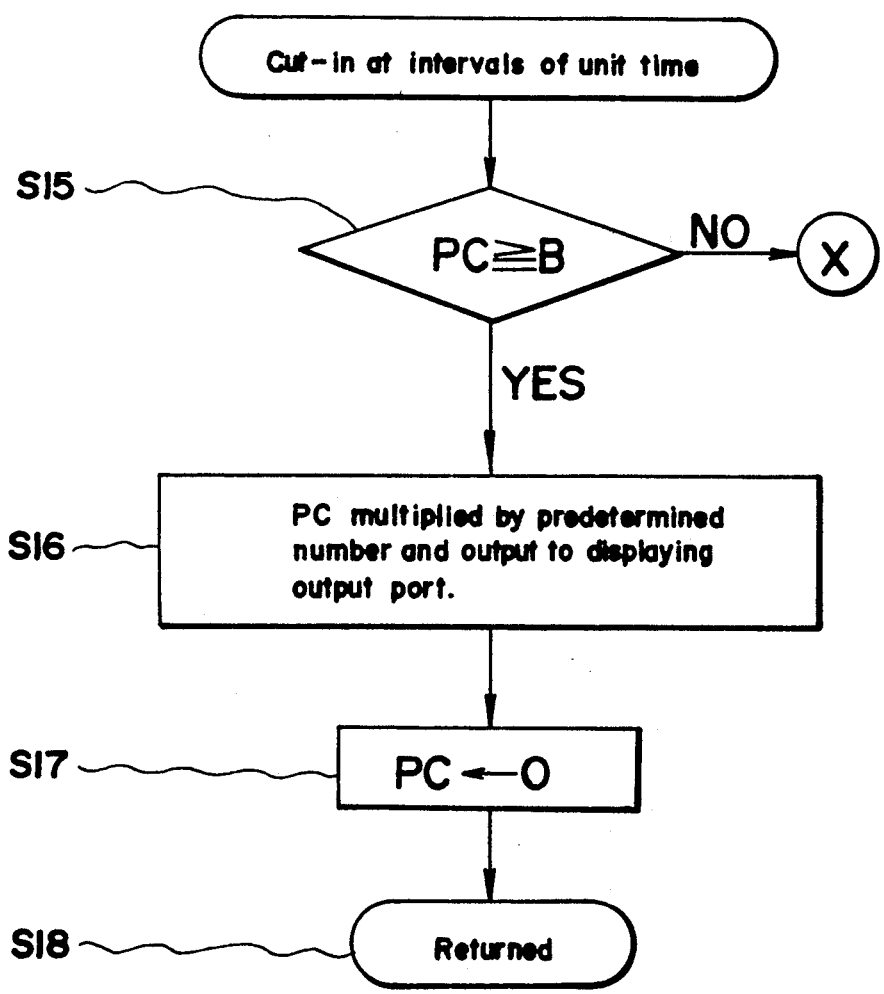
FIG. 7 is a flow chart showing a cut-in program routine.

An example of a flow chart by which the respective functions of the microcomputer 24 are obtained is explained with reference to FIGS. 6 and 7. In these Figures, S1 to S18 represent the respective processing steps and PC, $T_o$ and T represent respectively the contents of the predetermined addresses of the memory 26.

The process is started in step S1 by connecting the power source, thereby providing at the output port a signal "0" rendering in step S2 the contents of the PC set at "0". Then, in S3, a determination is made as to whether a pulse has been input from the waveform shaping means 3, specifically whether the rise of the pulse has been sensed). If it is judged that no pulse has been input, the process will return to S3 and will wait until a pulse is input. If it is determined that a pulse has been input, the process will move to S4, in which timing is initiated by a timer built into the microcomputer 24. At S5, the contents of the original PC are incremented by 1, moving the contents of the PC and the process to S6.

At S6, as at S3, a new pulse is detected, (i.e., whether a positive transition has occurred) and if no pulse has been input, the process will return to S6 and will wait until a pulse is input. If it is determined that a pulse has been input, the interval from the start of the timing (in S4) to this time point is stored at $T_o$ and the signal passed to S8 where, as at S4, timing is again initiated. The contents of the PC are again incremented by 1, and the process moves to S9a.

At S9a, as at S3, if no pulse rise has been detected, as above, the process will return to S9 and will wait until a pulse is input from the waveform shaping means 3. At S9a, if a pulse has been input, the signal moves to S10, where the timed value from the start of the timing (in S8) to the time just prior to this time point is stored at T and the process moves to S11.

At S11, it is determined whether $T - T_o \leq A$ so as to judge whether the contents of T are in an allowable range for the contents of the $T_o$. In S11, for example, it may be determined that:

$$\frac{T - T_o}{T_o} \leq A_o$$

wherein A and $A_o$ are constants determining the allowable range and are selected so as to be able to distinguish whether a pulse is obtained at the end of the injection of the corresponding cylinder by the difference of the pulse period or a pulse is obtained at the end of the injection of the other cylinder(s). At S11, when it is determined that the content of T is out of the given range, a NO signal returns the process to S9. The production of a NO signal by the microcomputer indicates that the detected pulse corresponds to a different cylinder, i.e., that it is not a normal pulse. On the other hand, if at S11 it is judged to be YES, then the contents of the T will be stored at $T_o$ and the process moves to S13, where, as at S4, the timer is reset. At S14, the PC is again incremented by 1, and the process returns to S9.

The main routine is formed of the respective steps shown in FIG. 6 as explained above. A cut-in is applied at predetermined intervals (for example, 0.5 second) from the initially set time point at S1. When such cut-in is applied during the process of the above-mentioned main routine, the cut-in process shown in FIG. 7 will be made. That is to say, the process moves to S15.

At S15, it is determined whether $PC \leq B$ or not so as to prevent the display of a number of revolutions considerably lower than the idling revolutions. The constant B is selected at a predetermined level to be of a value corresponding, for example, to 400 rpm. If it is judged that the rpm is lower, a NO signal is obtained and the process is returned to S1. The cut-in process ends, and the main routine restarts from the beginning. On the other hand, if the rpm value is acceptable, a YES signal is fed to S16, where the contents of the PC at that time point will be multiplied by a predetermined rpm number, and the product will be output to the display output port and step S17 initiated. At this step, the contents of the PC are set at "0" so that at S18 the state just before the cut-in of the main routine is returned and the cut-in process ends.

In the above, the steps S1 to S9 are so-called initial steps wherein the initial two pulses (pulses judged to have been input respectively at S3 and S6) ar considered to be normal pulses so that an initial pulse interval period (a timed value stored in the $T_o$ at S7) is obtained. The steps of S9 to S13 correspond to the detecting means 4 in FIG. 1 and the steps of S5, S9, S16, and S17 correspond to the counting means 5 in FIG. 1.

By the way, the contents of T correspond to the present period from the last normal pulse generated to the corresponding pulse, detected as being input at step S9. The contents of $T_o$ correspond to the previous period between respective normal pulses. Further, the contents of the PC correspond to the number of pulses per unit time of only the normal pulses.

In the revolution counter according to the present invention, when the vibration propagating through the fuel injection pipe 10 of the diesel engine is converted to an electric signal by the vibration detecting mean 1 and the amplitude of the output signal (the signal of the part (a) in FIG. 2) becomes larger than the predetermined level $V_T$, an output signal (the signal of the part (b) in FIG. 2) will be obtained from the amplitude sorting means 2. The respective pulse groups of this signal will be converted respectively to a pulse output signal (the signal of the part (c) in FIG. 2), as described above.

Therefore, the vibration component generated at the end of the injection within the nozzle of the cylinder corresponding to the fuel injection pipe 10 is larger in amplitude than all the other vibration components in the pipe. Consequently, as described above, when at low revolution the above-mentioned predetermined level $V_T$ is properly determined each pulse will be obtained (See FIG. 4(c)) only at the end of each injection of the corresponding cylinder from the waveform shaping means 3. On the other hand, at the time of high revolution not only the amplitude of the vibration component generated at the end of the injection within the nozzle of the cylinder corresponding to the fuel injection pipe 10 but also the amplitude of the vibration component generated at the end of the injection within the nozzle of the other, i.e., adjacent cylinder will become larger than the predetermined level $V_T$. Therefore, at the time of high revolution, the waveform shaping means 3 will not only provide a pulse at the end of each injection of the tested cylinder but will also produce a pulse at the end of each injection of the other cylinder (See FIG. 5(c)). The other vibration components propagating through the fuel injection pipe 10 are so much smaller in amplitude than the above-mentioned vibration components that, even at the time of high revolution, the amplitude will not become larger than the above-mentioned predetermined level $V_T$.

Thus, at the time of high revolution, a pulse will be obtained from the shaping means 3 at the end of the injection of the other cylinder which is greatly different in the generated time interval from the time interval obtained from the shaping means 3 at the end of the corresponding ignition cylinder (See FIG. 5(c)). That is to say, in the case of a diesel engine having four cylinders, the pulse obtained at the injection end of the other cylinder will be generated at the time point of either one or a plurality of four divisions of the period of the pulse obtained at each injection end of the corresponding cylinder. In the case of a diesel engine, for example, of six cylinders, such pulse will be generated at the time point of either one or a plurality of six divisions of the period of the pulse obtained at each injection end of the cylinder. Even if the diesel engine is quickly accelerated or decelerated, the period of any one revolution of the diesel engine will not fluctuate greatly with respect to the interval of the revolution just before it. Therefore, the period between the respective pulses obtained from the waveform shaping means 3 at the respective injection ends will not fluctuate greatly with respect to the respective adjacent periods. Whether the pulse obtained from the waveform shaping means 3 has been obtained at the injection end of the corresponding cylinder (the pulse corresponding to the part E and a normal pulse) or at the injection end of the other cylinder (the pulse corresponding to the part F and not the normal pulse), each pulse can be distinguished. This occurs whether or not the pulse in the present period has greatly fluctuated from the last normal pulse generated in the preceding period.

Therefore, by respectively sensing whether the differences between succeedingly respective pulses of the output signal of the above-mentioned waveform shaping means 3 are within a predetermined allowable range or not, the judging means 4 is capable of determining whether the output signal of the above-mentioned waveform shaping means 3 are normal pulses or not. On the basis of the judged result, the number of pulses per unit time of only the normal pulses among the respective pulses of the output signal of the shaping means 3 is counted by the counting means 5, and the number of revolutions corresponding to the counted value is displayed by the monitor 6, both at the time of low revolution and at the time of high revolution. The number of pulses per unit time of only the pulses obtained at the injection end of the corresponding cylinder among all the pulses of the output signal of the waveform shaping means 3 will be counted so that an accurate number of revolutions will be always displayed at the monitor 6.

Also, according to the present counter, the vibration detecting means 1 may be fitted to the fuel injection pipe 10 of the diesel engine and is easier to fit than in the case of fitting a detector to the rotary shaft as in the past.

By the way, in the above-described embodiment, the above-mentioned required function is realized by using the microcomputer 24. However, it is apparent that the present invention can be obtained by using only such hardware as a required logical circuit and counter.

Also, it is needless to say that in the present invention the number of revolutions of a diesel engine different in the number of cylinders and number of cycles can be counted.

As explained in detail in the above, according to the present invention, there can be obtained such effects that the detecting means is easy to fit, and not only at the time of low revolutions but also at the time of high revolutions the number of revolutions will be able to be accurately counted.

I claim:

1. A diesel engine revolution counter comprising:
    means for detecting the vibration propagating through a fuel injection pipe of a diesel engine and for converting said vibration to an electric signal;
    amplitude sorting means for receiving the electric signal and for providing an output signal comprising individual pulse groups, said pulse groups corresponding to respective fuel injection cycles;
    waveform shaping means for receiving the output signal and for converting respective pulse groups of said output signal into a pulse output signal, said pulse output signal comprising individual pulses, each of said pulses having a pulse width equal to the duration of its corresponding pulse group;
    judging means for receiving the pulse output signal, determining from respective pulses whether the period between respective pulses deviates from the preceding period between respective pulses by more than a predetermined amount and thereby determining whether the respective pulses of the pulse output signal are normal pulses or not;
    counting means for receiving said pulse output signal and for counting the number of pulses per unit time of only the normal pulses; and
    display means for displaying the number of revolutions corresponding to the counted value from the counting means.

2. The diesel engine revolution counter of claim 1 wherein the vibration detecting means comprises piezoelectric element mounted proximate said fuel injection pipe.

3. The diesel engine revolution counter of claim 1 wherein the vibration detecting means comprises a condenser microphone mounted proximate said fuel injection pipe.

4. The diesel engine revolution counter of claim 1 wherein said waveform shaping means comprises a multivibrator.

5. The diesel engine revolution counter of claim 1 wherein said display means comprises a liquid crystal array connected to the output of said counting means.

6. The diesel engine revolution counter of claim 1 wherein said display means comprises a light emitting diode array connected to the output of said counting means.

7. The diesel engine revolution counter of claim 1 wherein said counting means and said detecting means comprises a microcomputer.

* * * * *